United States Patent Office 3,829,447
Patented Aug. 13, 1974

3,829,447
(—)-9-OXO-5(S)-HYDROXY DECANOIC ACID LACTONE
Julius Berger, Passaic, and Michael Rosenberger, Caldwell, N.J., assignors to Hoffmann-La Roche Inc., Nutley, N.J.
No Drawing. Application Jan. 12, 1972, Ser. No. 217,294, now Patent No. 3,732,268, which is a division of application Ser. No. 57,371, July 22, 1970, now Patent No. 3,657,070. Divided and this application Jan. 31, 1973, Ser. No. 328,222
The portion of the term of the patent subsequent to Dec. 1, 1987 has been disclaimed
Int. Cl. C07d 7/06
U.S. Cl. 260—343.5                                                          1 Claim

ABSTRACT OF THE DISCLOSURE

Optically active 9-oxo-5(S)-hydroxy-decanoic acid is prepared by selective microbiological reduction of 5,9-dioxo-decanoic acid. The product acid is converted to levorotatory 9-oxo-5(S)-hydroxy-decanoic acid lactone by treatment of the reaction medium with a strong mineral acid. The aforesaid lactone is useful as an intermediate in the total synthesis of medicinally valuable, optically active steroids.

RELATED APPLICATIONS

This application is a divisional of applicants' copending U.S. Patent Application Ser. No. 217,294, filed Jan. 12, 1972 now U.S. Pat. No. 3,732,268, issued May 8, 1973 which in turn was a divisional of U.S. Patent Application Ser. No. 57,371, filed July 22, 1970 now U.S. Pat. No. 3,657,070, issued Apr. 18, 1972.

BACKGROUND OF THE INVENTION

The microbiological reduction of $\gamma$ and $\delta$-keto carboxylic acids has been described in U.S. Pat. No. 3,076,750, issued Feb. 5, 1963, inventors Muys et al. The resulting optically active $\gamma$ and $\delta$ hydroxy carboxylic acids obtained are converted to the corresponding lactones by acidification of the medium followed by solvent extraction, evaporating the solvent and then heating the residue at 100° to 130° C. for 1 to 3 hours. The product optically active lactones may be obtained in either enantiomeric form, the particular enantiomer obtained being dependent upon the identity of the microorganism utilized. Suitable microorganisms employed by patentees include yeasts or molds as well as particular strains of bacteria.

The racemic form of 9-oxo-5-hydroxy decanoic acid lactones has been described in U.S. Patent Application Ser. No. 824,319, filed May 13, 1969, 9-Oxo-5-Hydroxydecanoic Acid Lactone, inventors M. Rosenberger et al. now U.S. Pat. No. 3,544,600, issued Dec. 1, 1970. This compound was prepared by acid hydrolysis of 9,9-ethylenedioxy-5-hydroxy-decanoic acid lactone.

BRIEF DESCRIPTION OF THE INVENTION

The present invention relates to the preparation of the novel compounds 9-oxo-5(S)-hydroxy-decanoic acid and (—)-9-oxo-5(S)-hydroxy-decanoic acid lactone. These compounds may be obtained by the action of viable, reducing microorganisms on mediums containing 5,9-dioxo-decanoic acid. Upon completion of such treatment, the reaction medium is found to contain both the aforesaid compounds. Lowering of the pH of the reaction mixture with a strong mineral acid results in the conversion of the 9-oxo-5(S)-hydroxy-decanoic acid into the corresponding lactone. The lactone may then be isolated from the reaction medium employing conventional solvent extraction techniques known to the art. The product (—)-9-oxo-5(S)-hydroxy decanoic acid lactone is useful as a starting material in the total synthesis of optically active, medicinally valuable steroids.

The preparation of 5,9-dioxodecanoic acid used as starting material for the process of the present invention is described in U.S. Patent Application Ser. No. 57,362, filed of even date herewith, entitled "5,9-Dioxodecanoic Acid and Methods for its Preparation," inventor Michael Rosenberger now U.S. Pat. No. 3,654,326. While the present invention specifically relates to 5,9-dioxodecanoic acid it is understood that alkyl substituted analogs, e.g., the 3-alkyl analog may also be employed.

The desired products of the present invention 9-oxo-5(S)-hydroxy-decanoic acid and (—)-9-oxo-5-hydroxy-decanoic acid lactone are produced by reacting a culture of a viable levorotatory enantiomer producing microorganism having a reductive capacity or enzyme preparation derived therefrom by methods known per se such as acetone drying of the cells, with an aqueous medium containing 5,9-dioxodecanoic acid, at a pH of from about 3.5 to about 7.5, most preferably in the range of from about 4.5 to about 5.5 for about 12 to about 72 hours at a temperature of from about 10° to about 40° C., most preferably in the range of from about 10° to about 30° C. Generally, the substrate diketo acid will be employed in a concentration in the range of from about 0.1 to about 20 grams per liter, most preferably in the range of from about 1 to 4 grams per liter. While higher concentrations could be utilized, such higher concentrations will generally result in a lowering of the yield of desired product due to toxicity affects upon the microorganism employed.

The microbiological reduction of the present invention can be conducted under aerobic or anaerobic conditions. It is most desirable, however, for the purposes of this invention to utilize anaerobic conditions for the reduction. As used herein, the term "aerobic" is meant to refer to a reaction medium containing a dissolved oxygen concentration in an excess of 10 percent of air saturation. The term "anaerobic" refers to a reaction medium containing a dissolved oxygen concentration lower than 10 percent.

Suitable levorotatory enantiomer producing microorganisms having a reductive capacity, which are useful in the practice of the present invention include molds and selected bacteria. Examples of microorganisms useful in this invention include *Cladosporium butyri* (CBS Orla Jensen Strain), *Margarinomyces bubaki* (CBS Laxa Strain), *Cladosporium herbarum* (CBS Link ex Fr. Strain), *Sarcina lutea* (ATCC 381), *Sarcina lutea* (FDA PCI-1001), *Cladosporium cladosporoides* (U.S. Army Quarter Master Corps 489), *Cladosporium herbarum* (U.S. Army Quarter Master Corps 1027), *Cladosporium resinae* (U.S. Army Quarter Master Corps 1029), *Sarcina lutea* (ATCC 9341), *Cladosporium cladosporoides* (NRRL 3182), *Cladosporium fulvum* (NRRL 1671), *Cladosporium herbarum* (NRRL 2175), *Cladosporium resinae* (NRRL 1639 [S. Avellanum]), *Cladosporium sphaerospermum* (U.S. Army Quarter Master Corps 55b), *Cladosporium cladosporoides* (U.S. Army Quarter Master Corps 71d), *Sporotrichum sulfurescens* (ATCC 159).

A particularly preferred microorganism for use in the practice of the present invention is *Margarinomyces bubaki*. It has been found that under suitable conditions the microbiological conversion of 5,9-dioxo-decanoic acid to the desired end-product (—)-9-oxo-5-hydroxy-decanoic acid lactone can be accomplished in nearby quantitative yields. It should be noted that the starting material has two oxo groups which are amenable to reduction. The fact that the microbiological reduction can proceed in high yields to the desired 9-oxo-5-hydroxy decanoic acid product must be considered most unexpected in view of the presence of an additional reactive site in the product molecule. This is especially true when anaerobic conditions which favor reduction are employed.

In further preferred aspects of the present invention, the microorganism employed is allowed to develop vegetatively for a period of from 24 to 72 hours under aerobic conditions prior to dosing with substrate. Additionally, an oxygenase posion may be introduced into the reaction medium. Suitable oxygenase poisons include quinolines such as 8-hydroxyquinoline or cyanide salts, e.g., potassium cyanide.

Upon completion of the desired reaction, the reaction broth is acidified to below pH 2, most preferably to pH 1 by the addition of a strong mineral acid, such as concentrated sulfuric acid, hydrochloric acid, phosphoric acid or strong organic acids such as sulphonic acid, e.g., p-toluenesulphonic acid. This acidification step serves to convert the 9-oxo-5-hydroxy-decanoic acid present in the medium to the desired end-product (—)-9-oxo-5-hydroxy-decanoic acid lactone. The acidified broth may then be extracted with a suitable inert organic solvent which is immiscible with the aqueous phase. Particularly preferred organic solvents for this purpose are the chlorinated hydrocarbons, most preferably methylene chloride or chloroform; or esters such as ethyl acetate, butyl acetate and the like; or ketones such as methyl ethyl ketone or methyl isobutyl ketone.

Product (—)-9-oxo-5-hydroxy-decanoic acid lactone can be recovered from the organic solvent by evaporation of the solvent in a manner known per se. The product lactone may be purified by distillation in a conventional manner.

The product (—)-9-oxo-5-hydroxy-decanoic acid lactone is useful as an intermediate in the total synthesis of optically active, medicinally valuable steroids. Suitable procedures for the conversion of this compound into such steroids are described in U.S. Patent Application Ser. No. 57,372, filed of even date herewith, entitled "Tricyclic Oxygen Heterocyclics and Methods for Their Preparation, inventor Gabriel Saucy.

Example 1

An inoculum of the mold *Margarinomyces bubaki* was developed by placing 5 ml. of a spore suspension of the mold obtained from a potato dextrose agar test tube slant into 100 ml. of Edamin broth contained in cotton-plugged 500 ml. Erlenmeyer flasks Edamin broth contains; Edamin (enzymatic digest of *lactalbumin*) 20 gm.; corn steep liquor concentrate 3.0 ml.; dextrose (anhydrous D-glucose) 50 gm.; distilled water up to 1000 ml. The pH is adjusted to 5.0 with HCl before autoclaving for 15 minutes at 15 lbs. pressure. The pH after autoclaving is 4.8. This was then incubated on a 2 inch stroke continuous rotary shaker (New Brunswick Scientific Co.) at 28° C. and 250 r.p.m. After 4 days incubation, 4 ml. of inoculum were added to 100 ml. of Edamin broth in 500 ml. cotton-plugged flasks, and incubated again as above. After 2 days, 1 ml. of a 25 mg./ml. solution in ethanol of 5,9-dioxo-decanoic acid was added to each experimental flask. Aliquots of broth removed for analysis after 6 and 24 hours from the dosed flasks showed a 60 percent conversion of the diketo compound to product 9-oxo-5(S)-hydroxy-decanoic acid and (—)-9-oxo-5-hydroxy-decanoic acid lactone. This was measured by analysis of the lactone extracted with methylene chloride from 10 ml. broth aliquots acidified to below pH 1 by the addition of 0.2 ml. of concentrated $H_2SO_4$ and allowed to stand for 1 hour in the presence of 2 ml. of methylene chloride. The methylene chloride extract was then analyzed by vapor phase chromatography (VPC).

Example 2

An inoculum of the mold *Margarinomyces bubaki* was developed by placing 4 ml. of a spore suspension obtained from a potato dextrose agar slant into 100 ml. Edamin broth contained in a 500 ml. cotton-plugged Erlenmeyer flask. This was then incubated at 28° C. and 250 r.p.m. on a 2 inch stroke continuous rotary shaker (New Brunswick Scientific Co.). After 3 days, 3 ml. of this growth was inoculated into 100 ml. of Edamin broth in 500 ml. cotton-plugged Erlenmeyer flasks. After 2 days of incubation under the conditions described above, experimental flasks were dosed with 1 ml. of a 50 mg./ml. solution in ethanol of 5,9-dioxo-decanoic acid (giving a final concentration of 0.5 mg./ml.) and 1 ml. of a 100 mg./ml. solution in ethanol of 8-hydroxyquinoline (resulting in a final concentration of 1.0 mg./ml.). The flasks were then allowed to incubate in a stationary position at 28° C. Once a day, just prior to sampling, flasks were shaken by hand for a few seconds in order to obtain a homogeneous sample and to resuspend the cells. Aliquots of the dosed broth showed 100 percent conversion after 120 hours to product 9-oxo-5(S)-hydroxy-decanoic acid and (—)-9-oxo-5-hydroxy-decanoic acid lactone. The yield was determined by the following procedure:

Ten ml. of the broth was acidified to below pH 1 by the addition of 0.2 ml. of conc. $H_2SO_4$, after which 10 ml. of methylene chloride was added. This was shaken, allowed to stand for 1 hour, the emulsion was broken by centrifugation, and 5 ml. of the methylene chloride extract was evaporated to dryness. The residue of the extract was redissolved in ethyl acetate and this was used for the VPC analysis to determine the concentration of lactone in the sample.

Example 3

5,9 - Dioxodecanoic acid was added to the culture *Margarinomyces bubaki* prepared in the same manner as described in Example 2 above, but in the absence of 8-hydroxyquinoline. All other conditions of the experiment were the same as in Example 2. Upon analysis as before for the lactone produced, it was found that 95 percent of the substrate had been converted after 120 hours.

Example 4

An inoculum of the mold *Margarinomyces bubaki* was developed by placing 4 ml. of a spore suspension of the mold obtained from a potato-dextrose agar slant into 100 ml. of Edamin broth in a 500 ml. cotton-plugged Erlenmeyer flask. This was incubated on a 2 inch stroke continuous rotary shaker (New Brunswick Scientific Co.) at 28° C. and 250 r.p.m. After 4 days, 3 ml. of this growth was inoculated into 100 ml. of Edamin broth in replicate 500 ml. cotton-plugged Erlenmeyer flasks and reincubated under the conditions described above. After 2 days, the contents of the flasks were pooled and redistributed, 23 ml. per 125 ml. Erlenmeyer flask. Two ml. of a 12.5 mg./ml. solution in distilled water of 5,9-dioxodecanoic acid was added to each of the experimental flasks, giving a final concentration of 1 g./l. The flasks were then closed with rubber stoppers and placed on a shelf to incubate as stationary cultures at 28° C. The flasks were shaken briefly by hand once a day. Aliquots of the dosed flasks analyzed by VPC gave 75 percent conversion to products. Assay was by analysis of (—)-9-oxo-5-hydroxy-decanoic acid lactone produced after acidification of the sample of the reaction medium.

In this procedure 10 ml. of broth was first acidified to pH 2.0 by the addition of 0.05 ml. 50 percent $H_2SO_4$. Ten ml. of methylene chloride was added, the mixture was shaken, then store at 4° C. overnight. After centrifugation the next day, 5 ml. of the methylene chloride extract was evaporated to dryness and the residue was resuspended in 5 ml. of ethyl acetate, which was then analyzed by VPC.

Example 5

The inoculum and vegetable growth stages of *Margarinomyces bubaki* were developed in the same manner as described for rubber stoppered flasks in Example 4 above, with the exception that the 2 day vegetative growth was redistributed as 188 ml. per 300 ml. Erlenmeyer flask, instead of 23 ml. per 125 ml. flask. Twelve ml. of a 50 mg./ml. solution in water of 5,9-dioxodecanoic acid was added (giving a concentration of 3 g./l.). The culture was sparged with nitrogen and stirred with a magnetic stirrer. Incubation was carried out at 28°. Aliquots of the dosed culture assayed for product lactone by the analytical procedure described in Example 4 above gave 65 percent conversion after 144 hours of fermentation.

Example 6

Inoculum and vegetative growth stages of *Margarinomyces bubaki* were developed as described in Example 2. The experimental flasks were then dosed with 2 ml. of a 50 mg./ml. solution in ethanol of 5,9-dioxodecanoic acid (giving a concentration of 1 g./l.) and 1 ml. of a 100 mg./ml. solution in ethanol of 8-hydroxyquinoline (giving a concentration of 1 g./l.). The flasks were then incubated again at 28° C. and 240 r.p.m. Assay of aliquots taken from the dosed broth and analyzed by the analytical procedure outlined in Example 2 showed 100 percent conversion to products after 120 hours.

Example 7

An inoculum of *Margarinomyces bubaki* was developed by placing 5 ml. of a spore suspension obtained from a potoato dextrose agar test tube slant of the mold into 100 ml. of Edamin broth in a 500 ml. cotton-plugged Erlenmeyer flask. This was incubated at 28° C. and 250 r.p.m. on a 2 inch stroke continuous rotary shaker (New Brunswick Scientific Co.). After 3 days incubation, 4 ml. of growth was inoculated into 10 ml. Edamin broth in another 500 ml. cotton-plugged Erlenmeyer flask. The culture was then reincubated under the conditions described above. After 2 days, 1 ml. of a 25 mg./ml. solution in ethanol of 5,9-dioxodecanoic acid was added to the flask, which was again incubated as described above. Assay of the dosed broth was accomplished by the following analytical procedure:

The broth was acidified by addition of 2 ml. conc. $H_2SO_4$ per 100 ml. of broth. To 8 ml. of this acidified broth was added 2 ml. distilled water and 2 ml. methylene chloride. After shaking and centrifugation, the methylene chloride phase was separated from the broth and analyzed by VPC. This analysis showed a 76 percent conversion after 48 hours to products.

Example 8

An inoculum of *Margarinomyces bubaki* was developed by placing 5 ml. of a spore suspension from a potato dextrose agar slant into 100 ml. of Edamin broth contained in a 500 ml. cotton plugged Erlenmeyer flask. This was incubated at 28° C. on a 2 inch stroke continuous rotary shaker (New Brunswick Scientific Co.) operating at 250 r.p.m. After 3 days, 4 ml. of this growth were inoculated into 100 ml. of malt extract broth in a 500 ml. cotton-plugged Erlenmeyer flask, and incubated again under the conditions described above. Malt extract broth contains: Difco Bacto Malt Extract 200 g.; Bacto peptone 10 g.; Dextrose 20 g.; distilled water to 1 liter. The pH is adjusted with HCl to pH 5.7 before autoclaving; the pH after autoclaving is 4.8. After 2 days, the flask was aseptically fitted with a rubber stopper and allowed to incubate in the same manner for 3 more hours. It was then dosed with 2 ml. of a 50 mg./ml. solution in water of 5,9-dioxodecanoic acid, giving a concentration of 1 g./l. The culture was reincubated under the conditions described above. Aliquots of the dosed broth removed for VPC analysis showed 84 percent conversion after 120 hours to products as measured by extracted lactone by the following analytical procedure:

To 15 ml. of broth was added 0.6 ml. 50 percent $H_2SO_4$, 3 grams NaCl, and 15 ml. methylene chloride. This was shaken, allowed to stand for 30 minutes, shaken again, allowed to stand another 30 minutes, and centrifuged. 5 ml. of the extract was evaporated to dryness, the residue resuspended in 5 ml. ethyl acetate, and analyzed by VPC.

What is claimed is:

1. (−)-9-oxo-5-(S)-hydroxy-decanoic acid lactone essentially free of its dextrorotatory enantiomer.

References Cited

UNITED STATES PATENTS 3,544,600  12/1970  Rosenberger et al. __ 260—343.5

DONALD G. DAUS, Primary Examiner

A. M. T. TIGHE, Assistant Examiner